(12) United States Patent
Takagi et al.

(10) Patent No.: US 8,715,090 B2
(45) Date of Patent: May 6, 2014

(54) INFORMATION PROCESSING DEVICE, AND NON-TRANSITORY COMPUTER-READABLE STORAGE MEDIUM

(71) Applicant: DeNA Co., Ltd., Tokyo (JP)

(72) Inventors: Yuzo Takagi, Tokyo (JP); Shigeki Yoshida, Tokyo (JP); Kazumi Miyasaka, Tokyo (JP); Taichi Kobayashi, Tokyo (JP); Taro Kanno, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/026,969

(22) Filed: Sep. 13, 2013

(65) Prior Publication Data

US 2014/0094317 A1    Apr. 3, 2014

(30) Foreign Application Priority Data

Oct. 3, 2012   (JP) .................................. 2012-221512

(51) Int. Cl.
  *A63F 9/24*        (2006.01)
(52) U.S. Cl.
  USPC .................................. 463/42; 463/43; 463/8
(58) Field of Classification Search
  USPC .................................. 463/8, 31–43; 719/315
  See application file for complete search history.

(56) References Cited

U.S. PATENT DOCUMENTS

| | | | | |
|---|---|---|---|---|
| 8,287,378 | B2 * | 10/2012 | Ogawa | 463/42 |
| 2001/0016511 | A1 * | 8/2001 | Hino et al. | 463/8 |
| 2002/0095523 | A1 * | 7/2002 | Shimakawa et al. | 709/316 |
| 2003/0114226 | A1 * | 6/2003 | Kimura | 463/42 |
| 2004/0143852 | A1 * | 7/2004 | Meyers | 725/133 |
| 2004/0198498 | A1 * | 10/2004 | Yamashita et al. | 463/43 |
| 2013/0278631 | A1 * | 10/2013 | Border et al. | 345/633 |

FOREIGN PATENT DOCUMENTS

| | | |
|---|---|---|
| JP | 3350568 B | 10/1994 |
| JP | 2011-056129 A | 3/2011 |

OTHER PUBLICATIONS

Japanese Patent Application No. 2012-221512: Office Action mailed on Dec. 11, 2012.
Empire War Chronicle (Teikoku Senki), Famitsu mobage vol. 6, Enterbrain, Inc., Jun. 21, 2012, Weekly Famitsu, Jul. 19, 2012, Extra Edition, pp. 72-73, Description of the article "Strategy Technique 2, Acquire basic knowledge of War" of p. 73.

* cited by examiner

*Primary Examiner* — Masud Ahmed
(74) *Attorney, Agent, or Firm* — Procopio, Cory, Hargreaves & Savitch LLP

(57)  ABSTRACT

An information processing device configured to control a game in which a plurality of teams competes in a game field including a plurality of unit areas for occupation of the unit area, the information processing device includes: an occupant team determination unit configured to determine a team to occupy the unit area; a point providing unit configured to provide a point set to the unit area to a team to occupy the unit area; a storage unit configured to store an acquired point of each of the teams; a comparison unit configured to compare the acquired points of the teams; and a special area setting unit configured to set a special area that provides a special point in the unit area at a position where a team having a few acquired points more easily occupies the special area than a team having many acquired points from among the plurality of unit areas in accordance with the compared acquired points of the teams.

5 Claims, 11 Drawing Sheets

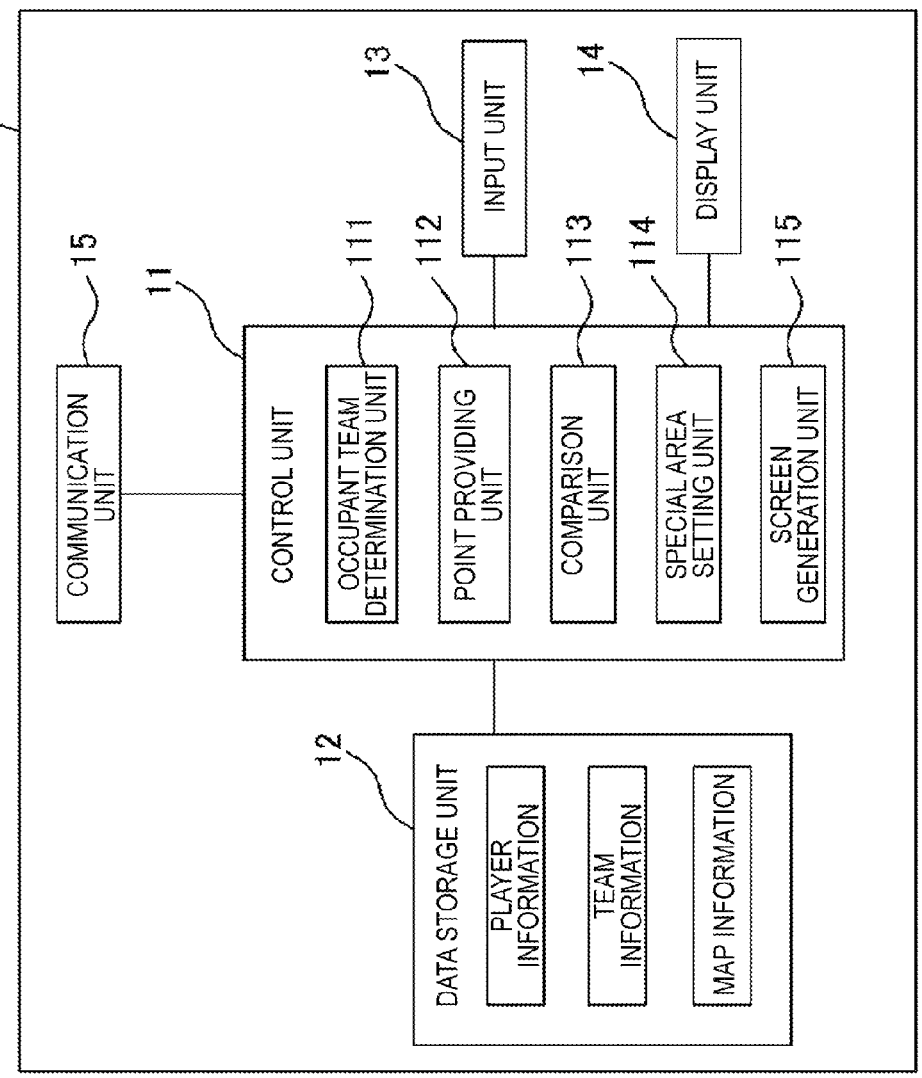

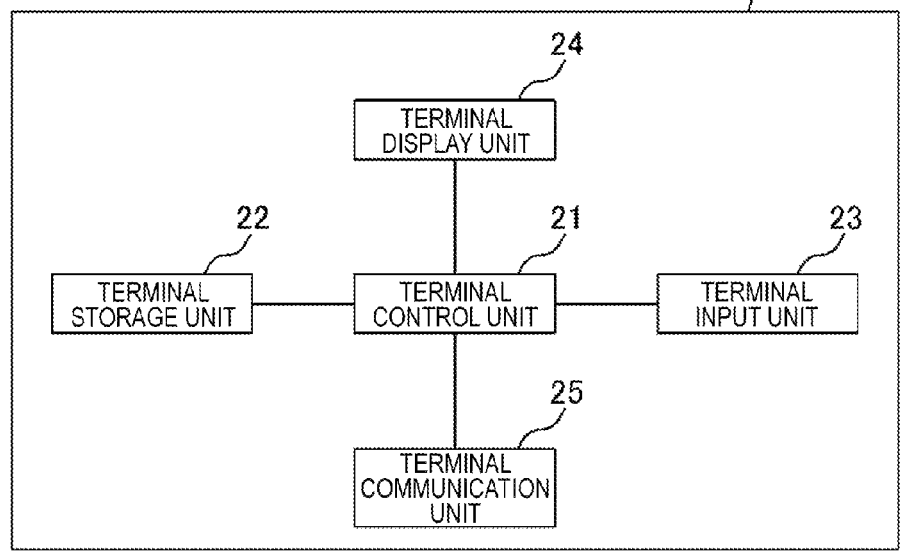

| PLAYER ID | TEAM PLAYER BELONGS TO | POSSESSED CARD INFORMATION | DECK INFORMATION | AREA LOCATION INFORMATION |
|---|---|---|---|---|
| 1 | X | POSSESSED CARD INFORMATION (1) | DECK INFORMATION (1) | AREA A |
| 2 | X | POSSESSED CARD INFORMATION (2) | DECK INFORMATION (2) | AREA C |
| 3 | Z | POSSESSED CARD INFORMATION (3) | DECK INFORMATION (3) | AREA I |
| 4 | Y | POSSESSED CARD INFORMATION (4) | DECK INFORMATION (4) | AREA E |
| 5 | Z | POSSESSED CARD INFORMATION (5) | DECK INFORMATION (5) | AREA J |
| 6 | X | POSSESSED CARD INFORMATION (6) | DECK INFORMATION (6) | AREA C |
| ⋮ | ⋮ | ⋮ | ⋮ | ⋮ |

FIG. 5

| | | | ... POINT |
TEAM Z
TEAM Y ... POINT
| TEAM X | | |
| MEMBER PLAYER (ID) | OCCUPIED AREA | ACQUIRED POINT |
| --- | --- | --- |
| 1, 2, 6, 9, 13, 18, ...... | A, B, C, D | 23 |

FIG. 6

| UNIT AREA ID | POINT | PATH CONNECTION INFORMATION | SPECIAL AREA SETTING INFORMATION |
| --- | --- | --- | --- |
| A | 20 | B | × |
| B | 5 | A, C | × |
| C | 5 | B, D | × |
| D | 15 | C, H, L, M | ○ |
| E | 20 | F | × |
| ⋮ | ⋮ | ⋮ | ⋮ |

INFORMATION PROCESSING DEVICE, AND NON-TRANSITORY COMPUTER-READABLE STORAGE MEDIUM

CROSS-REFERENCE TO RELATED APPLICATION(S)

This application claims the benefit of Japanese Patent Application No. 2012-221512, filed Oct. 3, 2012, the disclosure of which is hereby incorporated by reference in its entirety.

BACKGROUND OF THE INVENTION

1. Field of the Invention

The present invention relates to an information processing device and a game program.

2. Description of the Related Art

A game has been known, in which a battle is performed between player characters, and a third character (non-player character (NPC)) other than the player characters is introduced in the virtual game space, and the battle status is adjusted (for example, Japanese Patent Application Laid-Open No. 2011-056129).

SUMMARY OF THE INVENTION

When the battle status is adjusted in such a game, if direct involvement of the NPC in the game becomes prominent, the players are more likely to have a feeling of strangeness such as being controlled by the computer, and this may impair enjoyment and excitement of the player to the game. For example, when the outcome of the battle is determined by the intervention of the NPC, for example, the defeated player feels strong unfairness, and may lose desire to continuously play the game.

The present invention has been made in view of the foregoing, and an objective is to provide a fair game without causing the player to feel strangeness by an indirect intervention of the computer to the battle status of the player.

A principal invention to solve the above problem is an information processing device configured to control a game in which, when a plurality of teams competes for occupation of a unit area in a game field including a path between two unit areas from among a plurality of unit areas that is larger than the number of teams, the number of the paths forming a shortest route connecting the unit area occupied by one team when the game is started and the unit area occupied by another team when the game is started are all equal, the information processing device comprising: an occupant team determination unit configured to determine a team to occupy the unit area; a point providing unit configured to provide a point set to the unit area to a team to occupy the unit area; a storage unit configured to store an acquired point of each of the teams; a comparison unit configured to compare the acquired points of the teams; and a special area setting unit configured to set a special area that provides a special point in the unit area at a position where a team having a few acquired points more easily occupies the special area than a team having many acquired points from among the plurality of unit areas in accordance with the compared acquired points of the teams, wherein the number of the teams is three or more, a target area is set in any of the plurality of unit areas, the number of the paths forming a shortest route connecting the unit area occupied by each team when the game is started and the target area is equal, and a point set to the target area is larger than a point set to other unit areas.

Other characteristics of the present invention will become clear from the description of the present specification and the appended drawings.

According to the present invention, a fair game without causing the player to feel strangeness can be provided.

BRIEF DESCRIPTION OF THE DRAWINGS

FIG. 2 is a block diagram illustrating a functional configuration of a server device;

FIG. 3 is a block diagram illustrating a functional configuration of a player terminal according to the present embodiment;

FIG. 4 is a diagram illustrating an example of a data structure of player information stored in a data storage unit of a server device;

FIG. 5 is a diagram illustrating an example of a data structure of team information stored in the data storage unit of the server device;

FIG. 6 is a diagram illustrating an example of a data structure of map information stored in the data storage unit of the server device;

DETAILED DESCRIPTION OF THE INVENTION

Figure 1:
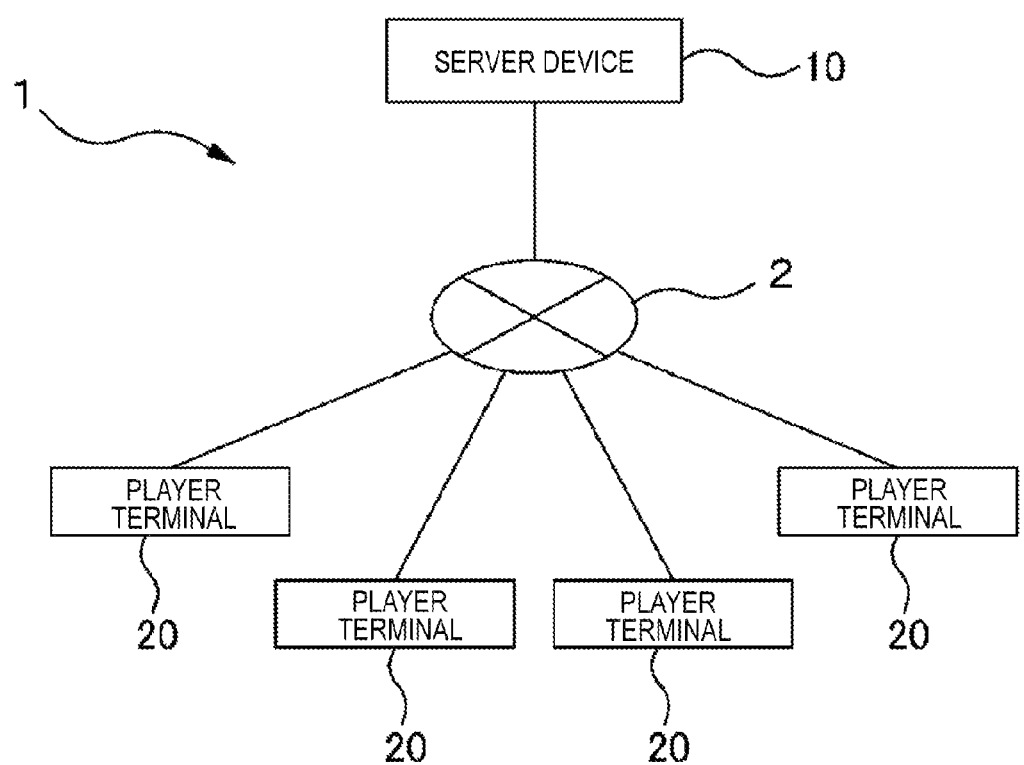
FIG. 1 is a diagram illustrating an example of an overall configuration of a game system according to the present embodiment.

At least the following matters will become clear according to the description of the present specification and the appended drawings.

An information processing device configured to control a game, in which a plurality of teams competes in a game field including a plurality of unit areas, for occupation of the unit area, the information processing device including: an occupant team determination unit configured to determine a team to occupy the unit area; a point providing unit configured to provide a point set to the unit area to a team to occupy the unit area; a storage unit configured to store an acquired point of each of the teams; a comparison unit configured to compare the acquired points of the teams; and a special area setting unit configured to set a special area that provides a special point in the unit area at a position where a team having a few acquired points more easily occupies the special area than a team having many acquired points from among the plurality of unit areas in accordance with the compared acquired points of the teams.

According to such an information processing device, a fair game without causing the player to feel strangeness can be provided.

Further, in the information processing device, the game field may include a path between two unit areas from among the plurality of unit areas, the number of the unit areas in the game field may be larger than the number of the teams, and the number of the paths forming a shortest route connecting the unit area occupied by one team when the game is started and the unit area occupied by another team when the game is started may be equal.

According to such an information processing device, each team is provided with the same condition when starting a game, whereby the game can be made more fair.

Further, in the information processing device, the number of the teams may be three or more, a target area may be set in any of the plurality of unit areas, the number of the paths forming a shortest route connecting the unit area occupied by each team when the game is started and the target area may be equal, and a point set to the target area may be larger than a point set to other unit areas.

According to such an information processing device, all teams are evenly provided with a chance to occupy the target area where many points can be obtained, whereby the game development can be made more thrilling. Especially, three or more teams are caused to compete for the occupation, whereby a more strategic game can be provided.

Further, in the information processing device, a path through which a plurality of routes commonly passes may be set in the game field, the plurality of routes connecting the unit area occupied by one team when the game is started and the unit area occupied by another team when the game is started.

According to such an information processing device, in conducting a battle against another team in a home area occupied at the time of start of the game, the player can dedicate the battle power to the one on one battle, thereby, more easily defending the home area.

Further, in the information processing device, the special area setting unit may set the special area such that the larger the gap of the acquired points between a team having many acquired points and a team having a few acquired points, the smaller the number of the paths forming a shortest route connecting the unit area occupied by the team having a few acquired points when the game is started and the special area.

According to such an information processing device, a team having a few acquired points more easily gets a chance to turn the tables. Therefore, monotony of the game, which is caused by the gap of the acquired points between the teams becoming larger, can be suppressed.

Further, a non-transitory computer-readable storage medium storing game program will become clear, which causes an information processing device to execute a game, in which a plurality of teams competes in a game field including a plurality of unit areas, for occupation of the unit area, and to execute the processing of: determining a team to occupy the unit area; providing a point set to the unit area to a team to occupy the unit area; storing an acquired point of each team; comparing the acquired points of the teams; and setting a special area that provides a special point, in the unit area at a position that is more easily occupied by a team having a few acquired points than a team having many acquired points, from among the plurality of unit areas, in accordance with the compared acquired points of the teams.

EMBODIMENTS

Configuration of Game System 1

FIG. 1 is a diagram illustrating an example of an overall configuration of a game system 1 according to the present embodiment.

The game system 1 provides a user (hereinafter, may be referred to as "player") with various services related to a game (social game, and the like) through a network 2. The game system 1 includes a server device 10 and a plurality of player terminals 20, both of which are connected to the network 2 in a communication capable manner.

The player can play a game transmitted through the network 2 by accessing the game system 1 from the player terminal 20. In addition, the player can communicate with a plurality of players by accessing the game system 1.

<Server Device 10>

FIG. 2 is a block diagram illustrating a functional configuration of the server device 10. The server device 10 is an information processing device (for example, a workstation, a personal computer, and the like) used when a system administrator and the like operates and manages a game service. When having received various commands (requests) from the player terminal 20, the server device 10 can distribute a game program operable on the player terminal 20, a Web page created by a markup language (HTML, and the like) compatible with a specification of the player terminal 20, and the like. The server device 10 of the present embodiment includes a control unit 11, a data storage unit 12, an input unit 13, a display unit 14, and a communication unit 15.

The control unit 11 performs data passing among units as well as controlling the entire server device 10. The control unit 11 includes an occupant team determination unit 111, a point providing unit 112, a comparison unit 113, a special area setting unit 114, and a screen generation unit 115. Specific operations of these units will be described below.

The data storage unit 12 includes a read only memory (ROM) that is a read only storage area in which a system program is stored and a random access memory (RAM) that is a rewritable storage area used as a work area for arithmetic processing by the control unit 11. The data storage unit 12 is, for example, realized by a non-volatile storage device, such as a flash memory and a hard disk. The data storage unit 12 of the present embodiment stores player information that is information related to the player, team information that is information related to a team to which the player belongs, map information that is information related to a map screen (game field) displayed when a game is played, and the like. Data structures of these pieces of information will be described below.

The input unit 13 is used for inputting various data and setting related to and a game (for example, a setting condition of a special area described below, and the like) by the system administrator and the like, and is realized by, for example, a keyboard, a mouse, and the like.

The display unit 14 is used for displaying an operation screen for the system administrator based on a command from the control unit 11, and is, for example, realized by a liquid crystal display (LCD) and the like.

The communication unit 15 is used for performing communication with the player terminal 20, and has a function as a reception unit that receives various data and signals transmitted from the player terminal 20, and a function as a transmission unit that transmits various data and signals to the player terminal 20 according to a command of the control unit 11. The communication unit 15 is, for example, realized by a network interface card (NIC), and the like.

<Player Terminal 20>

FIG. 3 is a block diagram illustrating a functional configuration of the player terminal 20. The player terminal 20 is an information processing terminal operated by the player (user) when playing a game. The player terminal 20 is a mobile phone terminal, a smart phone, a personal computer, a game device, or the like, for example, and performs transmission/reception of information with an accessible server device 10 through the network 2. The player terminal 20 includes a terminal control unit 21, a terminal storage unit 22, a terminal input unit 23, a terminal display unit 24, and a terminal communication unit 25.

The terminal control unit 21 performs data passing among units and controls the entire player terminal 20, and is realized by the central processing unit (CPU) that executes a program stored in a predetermined memory. Note that the terminal control unit 21 of the present embodiment also functions as a screen display control unit that controls the display state of the game screen displayed on the terminal display unit 24.

The terminal storage unit 22 is connected to the terminal control unit 21 through a bus, and performs processing of referring to, reading out, rewriting stored data according to a command from the terminal control unit 21. The terminal storage unit 22 is realized, for example, by a flash memory, a hard disk, and the like.

The terminal input unit 23 is used by the player for performing various operations (a game operation, a text input operation, and the like), and is realized, for example, by an operation button, a touch panel, and the like.

The terminal display unit 24 is used for displaying a game screen (a screen map, and the like, described below) generated based on game information by a command from the terminal control unit 21, and is realized, for example, by a liquid crystal display (LCD) and the like.

The terminal communication unit 25 is used for performing communication with the server device 10, and includes a function as a reception unit that receives various data and signals transmitted from the server device 10, and a function as a transmission unit that transmits various data and signals to the server device 10 according to a command from the terminal control unit 21. The terminal communication unit 25 is, for example, realized by a network interface card (NIC), and the like.

<<Data Structure>>

As described above, various data including the player information, the team information, the map information, and the like are stored in the data storage unit 12 of the server device 10.

FIG. 4 is a diagram illustrating an example of a data structure of the player information stored in the data storage unit 12 of the server device 10. The player information includes items such as a player ID, a team the player belongs to, possessed card information, deck information, and area location information. The player ID is identification information that identifies the player. The team the player belongs to is information that indicates a team to which the player currently belongs to. The possessed card information is information that indicates a game card (hereinafter, may be referred to as possessed card) possessed by the player. Note that each game card includes a unique parameter, and the parameter is stored in the data storage unit 12 in association with each game card (an ID of the game card). The deck information is information related to a deck constructed by the player. Note that the deck is information that indicates the types of a plurality of possessed cards and its arrangement, and the players uses the mutual decks and performs a battle described below. The area location information is information that indicates a current location (a unit area described below) of the player on the game field (on the map screen) when advancing a game.

FIG. 5 is a diagram illustrating an example of a data structure of the team information stored in the data storage unit 12 of the server device 10. In the present embodiment, a team is composed of one or more players. The team information includes items such as a member player, an occupied area, and an acquired point. The member player is information that indicates all players (IDs of the players) who belong to the team. The occupied area is information that indicates an area occupied by the team among the unit areas displayed on the map screen. Note that details of occupation of a unit area will be described below. The acquired point is information that indicates a total value of points provided when the team occupies a unit area, and an outcome of a game is determined by completing with other teams for the acquired points.

FIG. 6 is a diagram illustrating an example of a game structure of the map information stored in the data storage unit 12 of the server device 10. The map information is information that indicates a "game field" that is an area set in a virtual game space (an area defined on a program), and a map screen of a game is generated based on the map information. The map information includes items such as an ID of a unit area, a point of a unit area, pass connection information of a unit area, and special area setting information. The ID of a unit area is information that identifies a plurality of unit areas arranged on the map. The point of a unit area is information that indicates magnitude of the point set for each unit area. The point is provided to a team that occupies the unit area based on a predetermined condition. The path connection information of a unit area is information that indicates a relationship between unit areas connected by a path described below, and stores unit areas to be connected and a distance between the unit areas. The special area setting information is information that indicates an area to which a special area is set, special area being an area to which a special point is provided.

<<Outline of Game>>

An outline of a game provided by the game system 1 will be described.

The present embodiment is a game in which a plurality of teams composed of one or more players competes for occupation of a plurality of unit areas displayed on a game field (map screen). To be specific, each team occupies a unit area, and the outcome of the game is determined by the magnitude of the points that is provided as a result of the occupation of the unit area.

<Game Field (Map Screen)>

Figure 7:
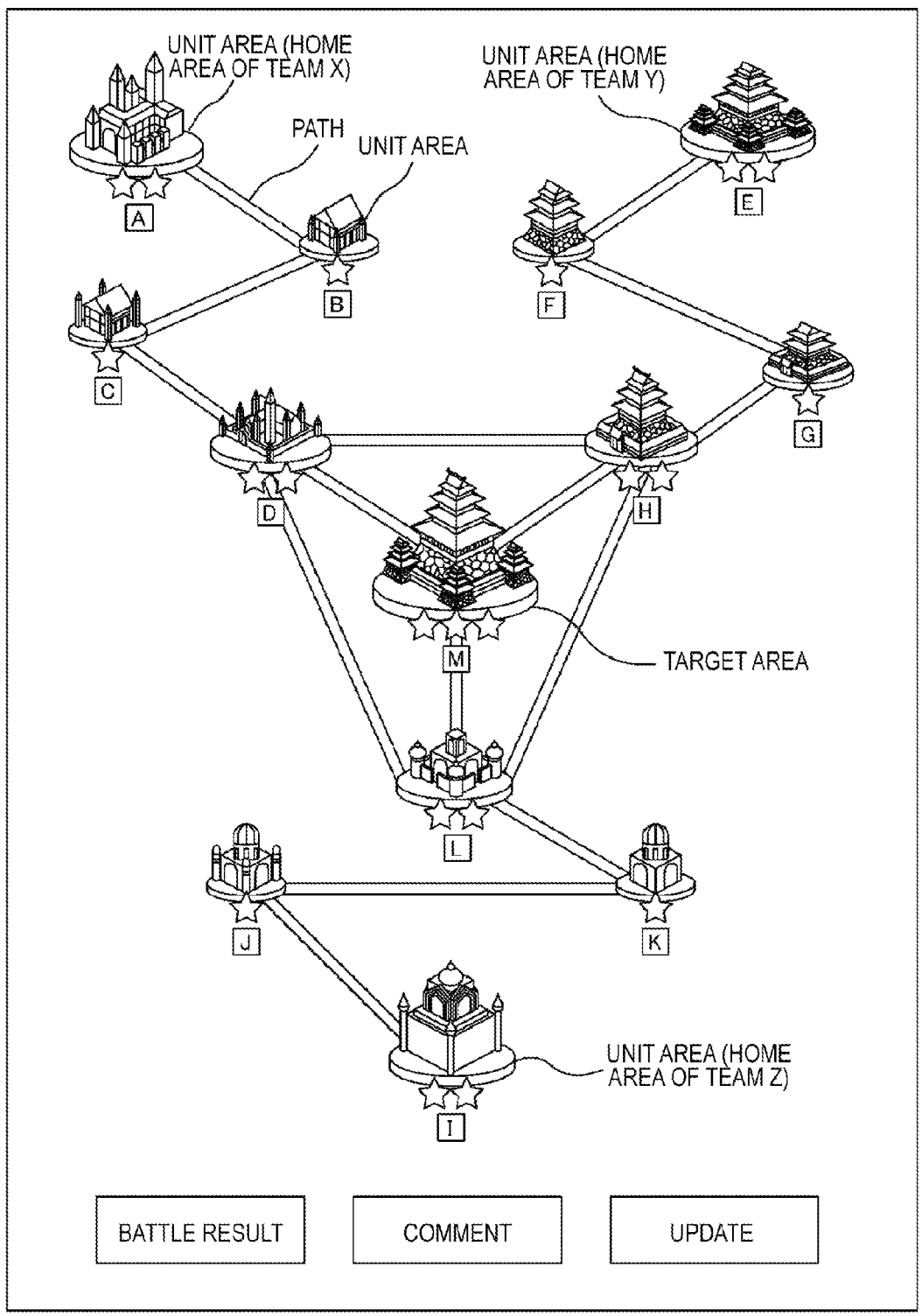
FIG. 7 is a diagram illustrating an example of a map screen actually displayed in a terminal display unit.

FIG. 7 is a diagram illustrating an example of a map screen actually displayed in the terminal display unit 24 based on the map information. The game field (map screen) of the present embodiment includes a plurality of unit areas. The map screen in the drawing is provided with thirteen unit areas of A to M. Then, the game progresses as the plurality of teams competes for occupation of the unit areas. Note that, in the drawing, one or a plurality of stars is displayed in each unit area. The number of the displayed starts gives an indication of the points set to the unit area. The larger the number of the displayed stars, the more points are set to the unit area. For example, in FIG. 7, three stars are displayed in a unit area M located in the center of the map screen. Therefore, by checking the number of the displayed stars, the player can confirm a team that occupies the unit area M can acquire (be provided with) the most points.

Each unit area has at least one path. The path corresponds to a "route" connecting two different unit areas, and connecting one unit area and another unit area. For example, a unit area A and a unit area B are connected with one path. A player (a character operated by the player) in the unit area A on the map screen can move to the unit area B by passing through the path that connects the unit area A and the unit area B. Further, there is a unit area having a plurality of paths. For example, a unit area D has four paths, the four paths are connected to unit areas C, H, L, and M, respectively. In this case, the player in the unit area D can move to a desired target area by selecting the target area from the unit areas C, L, H, and M.

Note that, while, in FIG. 7, the thirteen unit areas and the paths provided therewith are displayed, the number of unit areas and paths provided on the game field and the location relationship therebetween are not limited to the example, and the game field has various variations.

<Occupation of Unit Area>

In the present embodiment, points set to the unit area are provided to the team that occupies the unit area. Therefore, to acquire more points, a plurality of teams competes for the occupation of the unit areas. Hereinafter, an example in which three teams (teams X, Y, and Z) compete for the occupation of the unit areas will be described.

At a start of a game, each team occupies one unit area. In FIG. 7, the team X occupies the unit area A, the team Y occupies the unit area E, and the team Z occupies the unit area I. In this way, the unit area occupies by each team when a game is started is called "home area" of the team for convenience. Each home area is provided with only one path.

When a game is started, a player who belongs to a team moves to a next unit area by passing through the path of the home area of the team. For example, a player X1 who belongs to the team X moves to the unit area B from the home area (unit area A) by passing through the path connecting the unit area A and the unit area B. Then, when the player X1 reaches the unit area B, the area location information of the player X1 becomes the unit area B, and the unit area B is occupied by the team X to which the player X1 belongs. Note that a player who belongs to the same team can freely move among the unit areas occupied by the team. For example, the team X occupies the unit areas A, B, and C, a player X2 who belongs to the team can freely move between the unit area A and the unit area C.

In this way, the players who belong to each team move to new unit areas, so that the unit areas occupied by the team are enlarged. In the present embodiment, the number of unit areas displayed on the map screen is set larger than the number of the teams so that a plurality of teams is to compete for the occupation of the unit areas.

Note that the shortest distances between the home area of one team and the home area of another team are all set equal. In other words, the numbers of the paths that form the shortest route connecting a unit area occupied by one team when a game is started and a unit area occupied by another team when a game is started are all set equal. For example, in FIG. 7, the short distance between the unit area A that is the home area of the team X and the unit area E that is the home area of the team Y is seven paths. The shortest distance between the home area (unit area A) of the team X and the home area (unit area I) of the team Z is also seven paths. Further, the shortest distance between the home area (unit area E) of the team Y and the home area (unit area I) of the team Z is also seven paths. That is, each team has the same geographical condition related to the game field. In this way, by providing the teams with the same condition when a game is started, the game can be made fair.

<Battle>

In the game of the present embodiment, each of a plurality of teams occupies a unit area. Therefore, there may be a scene on the map, in which players who belong to different teams face each other. In such a case, a battle is caused between the players. The battle is conducted using a deck in which a plurality of cards possessed by each player is arranged. Note that the strength of the deck of the player is determined by parameters such as attack power and defense power set to each card, arrangement of the cards, and the like.

Figure 8A:
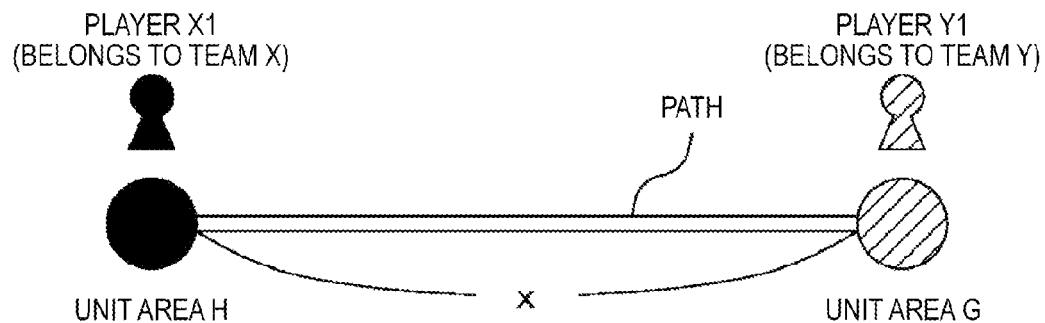
FIGS. 8A to 8C are diagrams describing a flow when a battle occurs.
Figure 8B:
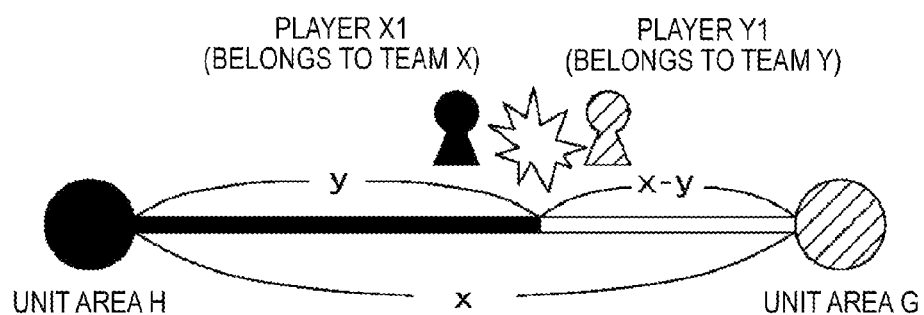
Figure 8C:
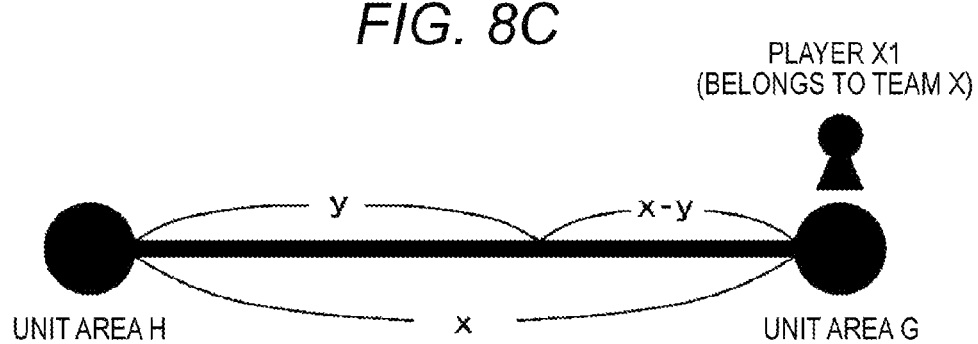

A specific flow of competing for occupation of a unit area by a battle will be described. FIGS. 8A to 8C are diagrams describing a flow when a battle is caused. As illustrated in FIG. 8A, the team X occupies a unit area H, and the team Y occupies a unit area G. Further, the length (distance) of the path that connects the unit area H and the unit area G is x. With this state, when the player X1 who belongs to the team X proceeds from the unit area H to the unit area G in order to occupy the unit area G, a battle against the player (referred to as player Y1) who belongs to the team Y that occupies the unit area G is caused.

Note that, when there is another player who belongs to the same team exists in the same unit area, the player can participate in the battle as an ally. For example, when a player X2 who belongs to the team X exists in the unit area H, the player X2 participates in the battle as an ally of the player X1. Therefore, the battle can be more advantageously developed if there are more players who belong to the same team in the unit area. In addition, the strength of the deck of the player X1 who conducts the battle may be changed in accordance with the number of players, who belongs to the team X, existing in the unit area H.

As a result of the battle, when the player X1 provides player Y1 with a predetermined amount of damage Y, the player X1 can move on the path from the unit area H to the unit area G by the distance in accordance with the magnitude of the damage Y. FIG. 8B illustrates a case in which the player X1 moves from the unit area H to the unit area G by y. That is, the player X1 can reach the unit area G by moving on the path by a remaining distance (x-y).

Then, as illustrated in FIG. 8C, when the player X1 (or another player who belongs to the team X would also be fine) repeats a battle and accumulates the damage given to the opponent, and moves on the remaining distance (x-y) to reach the unit area G, the unit area G becomes occupied by the team X to which the player X1 belongs. Note that the team Y who previously occupied the unit area G until then no longer occupy the unit area G, and thus, the player Y1 who belongs to the team Y having existed in the unit area G is forced to move out to another unit area (another unit area occupied by the team Y).

Alternatively, the battle of the present embodiment may be caused between the player and a virtual enemy character operated by the server device 10, other than caused between the player and another player. For example, when the unit area G is not occupied by any team in FIG. 8, the server device 10 arranges a virtual enemy character V in the unit area G. Then, the player X1 is going to move in the unit area G, a battle against the virtual enemy character V is caused, and the player X and the virtual enemy character complete for occupation of unit areas in a similar manner to the description of FIGS. 8A to 8C. In this way, by adjusting the difficulty of occupying a unit area, a game element can be appropriately maintained.

Alternatively, a team that occupies a unit area is brought into a battle by two or more other teams at the same time. For example, when the team X occupies the unit area H, the team Y occupies the unit area G, and the team Z occupies the unit area L in FIG. 7, there is a possibility that the team X is brought into a battle by the team Y and the team Z at the same timing. In this case, the team X is required to conduct the battle against the two opponent teams, the battle power (the number of players who participate in the battle) is easily divided. Therefore, there is a high possibility that the team X loses the battle and the unit area H is occupied by other teams. That is, when a team occupies a unit area that has many paths (for example, the unit area H of FIG. 7), there is a possibility that a battle against two or more teams is caused at the same time, and it becomes difficult to defense the unit area. Meanwhile, by setting points set to a unit area having many paths (the number of starts displayed on the map screen) larger, each team goes for occupation of the unit area at the risk of difficulty in defense. Therefore, a strategic element of the game can be enhanced.

By the way, in the case of FIG. 7, the number of paths provided in the home area of each team is only one. Therefore, even if other teams attacks the home area, the team of the home area does not conduct a battle against two or more teams at the same time, and can dedicate entire battle power of the team (the number of players who belongs the team) to the battle against one team, whereby it is easier to defense the home area. In the case of FIG. 7, there is only one path with no divergence from a home area of each team to a unit area that is three paths away from the home area. Therefore, there is no situation where a team based in this zone conducts a battle against a plurality of other teams at the same time. Therefore, a unit area that exists in such a zone can be easily defended by the team based in the zone, while is less easily to be occupied by other teams. Note that, even if there is a plurality of paths provided in the home area of each team, a team based in a home area near the limited zone can easily defend the base area as long as the number of paths provided from one home area to another home area is limited in the middle of the paths. For example, even if a path is provided between the unit areas A and C of FIG. 7, the path between the unit areas C and D is limited to one. Therefore, the team X can easily defend the unit area C. That is, by providing a path, through which a plurality of routes that connects one home area and another home area commonly passes (for example, the path between the unit areas C and D of FIG. 7), in the unit area to which the path is provided (for example, the unit area C in FIG. 7), a team based in a home area near the unit area can defend the unit area more easily, and it is less easy for other teams to occupy the unit area.

<Target Area>

In the game field (map screen), a unit area is set as a "target area", to which particularly many points are set. In the case of FIG. 7, a unit area M positioned in the center of the screen is set as the target area. Since three stars are displayed on the unit area M, a team that occupies the unit area M is provided with particularly many points. Therefore, each team preferentially goes for the occupation of the target area.

The position of the target area is set such that the shortest distance from each home area of each team becomes equal. In other words, it is set such that the number of paths that forms the shortest route from the target area and unit area (home area) occupied by a team when a game is started becomes equal. With this, the teams are provided with the same condition when starting a game, whereby the game can be made fair.

Note that it is desirable that the target unit area is provided with many paths. By providing many paths, it becomes possible to proceed in to the target area from many directions. Therefore, each team can get more chances to occupy the target area. For example, the target area (unit area M) has three paths in FIG. 7. Therefore, there is a possibility that the unit area M may be brought into a battle from the three unit areas D, H, and L. Even if the team X occupies the target area, it is difficult for the team X to continuously occupy the unit area M if being attacked by the team Y (the player who belongs to the team Y) and the team Z (the player who belongs to the team Z) at the same time. Therefore, the team Y and the team Z get more chance to occupy the target area, and can more easily overtake the team X in terms of the acquired points.

In this way, by providing a chance to all teams to occupy the target area instead of allowing only one team to occupy the target area, the game development can be more thrilling, and the enjoyment and excitement of the player can be enhanced. Especially, by causing three or more teams to compete for the occupation of the unit area, more strategic game can be provided.

<Setting of Special Area>

Figure 9:
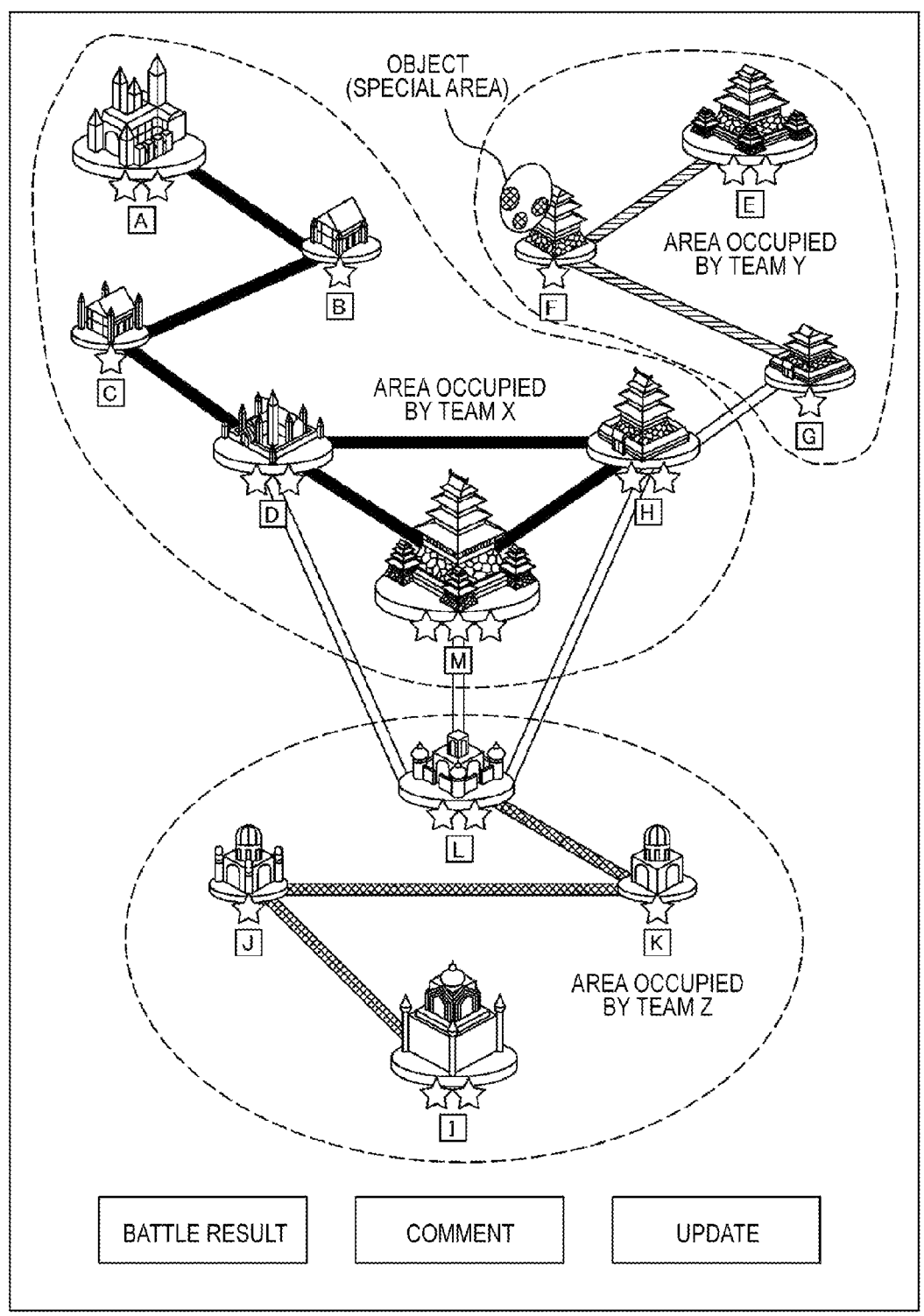
FIG. 9 is a diagram illustrating an example of a map screen in a state where a game progresses to some extent.

FIG. 9 is a diagram illustrating an example of a map screen in a state where a game progresses to some extent. When the game progresses, and each team occupies the unit areas, the gap of the acquired points among the teams may sometimes be widened. In FIG. 9, the team Y and the team Z occupy more unit areas than the team X, and thus, the gap of the acquired points between the team X and other teams becomes increased. If the gap of the acquired points becomes too large, the players who belong to the team having a few acquired points may lose the excitement and enjoyment or may give up the battle, and thus, the game may become monotony.

Therefore, in the game of the present embodiment, to provide a team having a few acquired points with a chance to turn the tables, the special area is set to any of a plurality of unit areas on the map screen at a predetermined timing. Then, a team that occupies the unit area that is set as the special area is provided with special points, with which the team can advantageously advance the game. For example, the team that occupies the special area may be provided with five times the normal points, or may take points from a team having many points. Therefore, even a team having a few acquired points at the current moment can get a chance to get the acquired points by occupying the unit area set as the special area.

The special area is set by the special area setting unit 114 of the control unit 11. In the present embodiment, an object is displayed on the unit area to be set as the special area on the map screen. In FIG. 9, an egg-like object is displayed on the unit area F. However, other objects such as a magic stone may be displayed. Further, other than displaying the object, a method of blinking the unit area or displaying the unit area in red may be employed. Details of a setting operation of the special area will be described below.

<<<Operation Example of Game System 1>>>

An operation example performed by the game system 1 according to the present embodiment will be specifically described. Hereinafter, an occupant team determination operation for determining a team to occupy each unit area on the game field will be described first, and then, a special area setting operation for providing special points will be described.

<Occupant Team Determination Operation>

Figure 10:
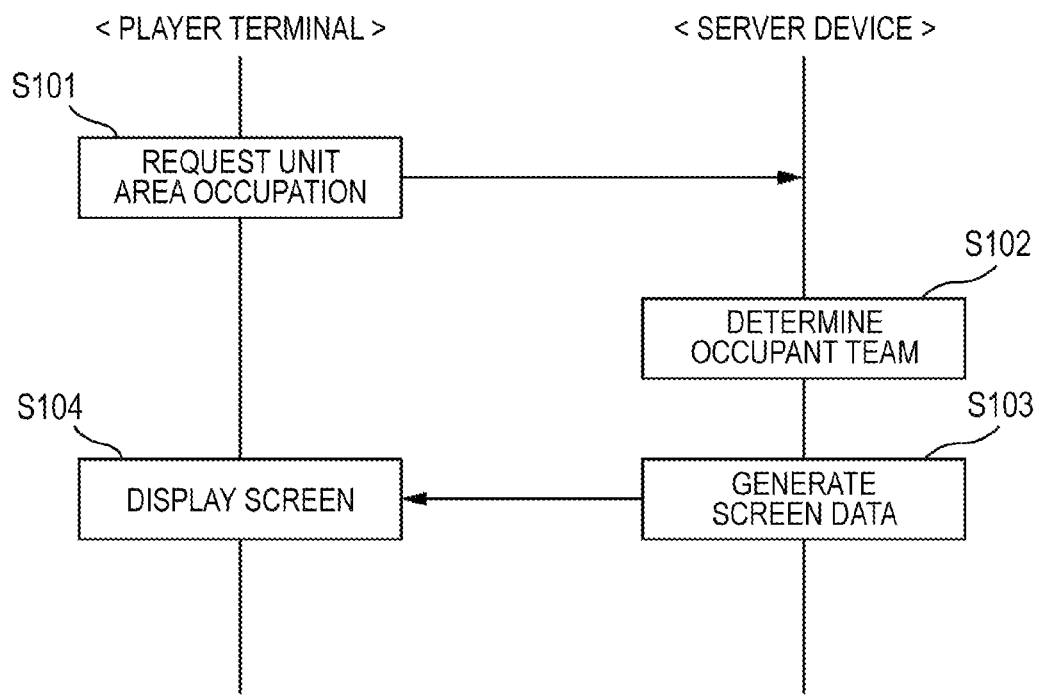
FIG. 10 is a diagram describing occupant team determination operation.

FIG. 10 is a diagram describing an occupant team determination operation. When a game is started, a player who belongs to a certain team requests occupation of a predetermined unit area (here, unit area X) to the server device 10 through the player terminal 20 (S101). Here, the request of occupation of a unit area is synonymous with a request of movement from a unit area (home area at the time of start of the game) where the player currently exists toward a unit area to be occupied.

Figure 11:
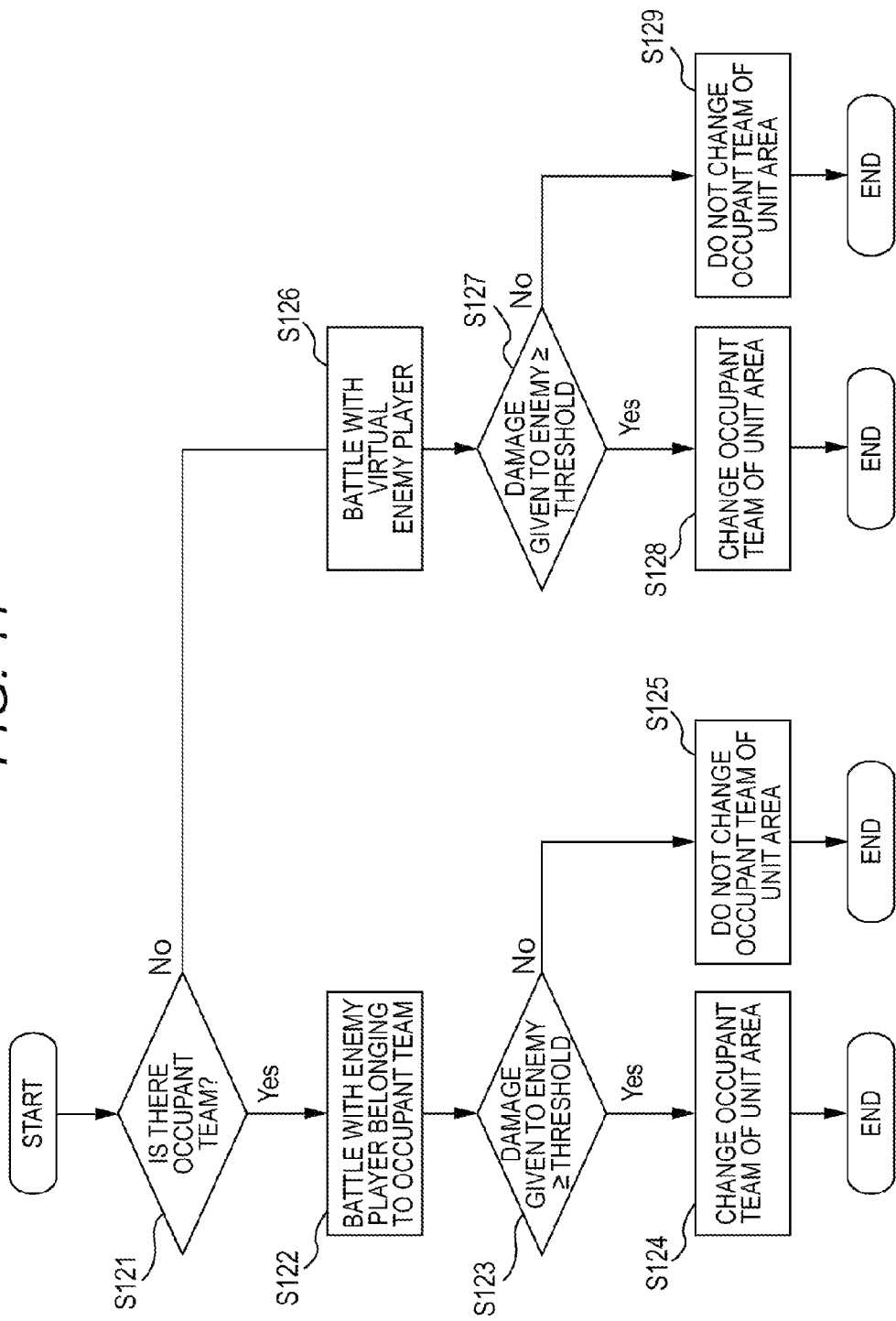
FIG. 11 is a flowchart of occupant team determination processing performed by an occupant team determination unit.

When the server device 10 receives the request from the player, the occupant team determination unit 111 of the control unit 11 determines an occupant team of the unit area, occupation of which has been requested (S102). FIG. 11 is a flowchart of occupant team determination processing performed by the occupant team determination unit 111.

When occupation of the unit area X has been requested, the occupant team determination unit 111 confirms whether there is a team that has already occupied the unit area X (S121). When there is a team that has already occupied the unit area X (Yes in S121), the occupant team determination unit 111 causes a battle between a player who belongs to the occupant team (enemy player) and the player who has requested the occupation in S101 (S122). As a result of the battle, when the damage given to the enemy player by the player who has requested the occupation is a predetermined threshold or more (Yes in S123), it is treated that the occupation by the team of the requestor player is succeeded, and the occupant team of the unit area X is changed (S124). Meanwhile, when the damage given to the enemy player by the player who has requested the occupation is less than the predetermined threshold (No in S123), it is treated that the occupation by the team of the requestor player has been failed, and the occupant team of the unit area X is not changed (S125).

At the timing when the occupation request about the unit area X has been given, there is no team that occupies the unit area X (No in S121), a battle is caused between a virtual enemy player operated by the control unit 11 and the player who has requested the occupation (S126). As a result of the battle, when the damage given to the virtual enemy player by the player who has requested the occupation is a predetermined threshold or more (Yes in S127), it is treated that the occupation by the team of the requestor player is succeeded, and the occupant team is caused to be the occupant team of the unit area X (S128). Meanwhile, when the damage given to the virtual enemy player by the player who has requested the occupation is less than the predetermined threshold (No in S127), it is treated that the occupation by the team of the requestor player is failed, and the occupant team of the unit area X is not changed (S129), and the state is maintained, in which there is no team that occupies the unit area X.

When a team to occupy the unit area X is determined, the screen generation unit 115 of the control unit 11 generates data of the map screen, on which the occupant team of the unit area X is displayed, based on a result thereof (for example, see FIG. 9) (S103). Then, the generated data of the map screen is transmitted to the player terminal 20, and is displayed on the map screen of the terminal display unit 24 (S104).

<Special Area Setting Operation>

Figure 12:
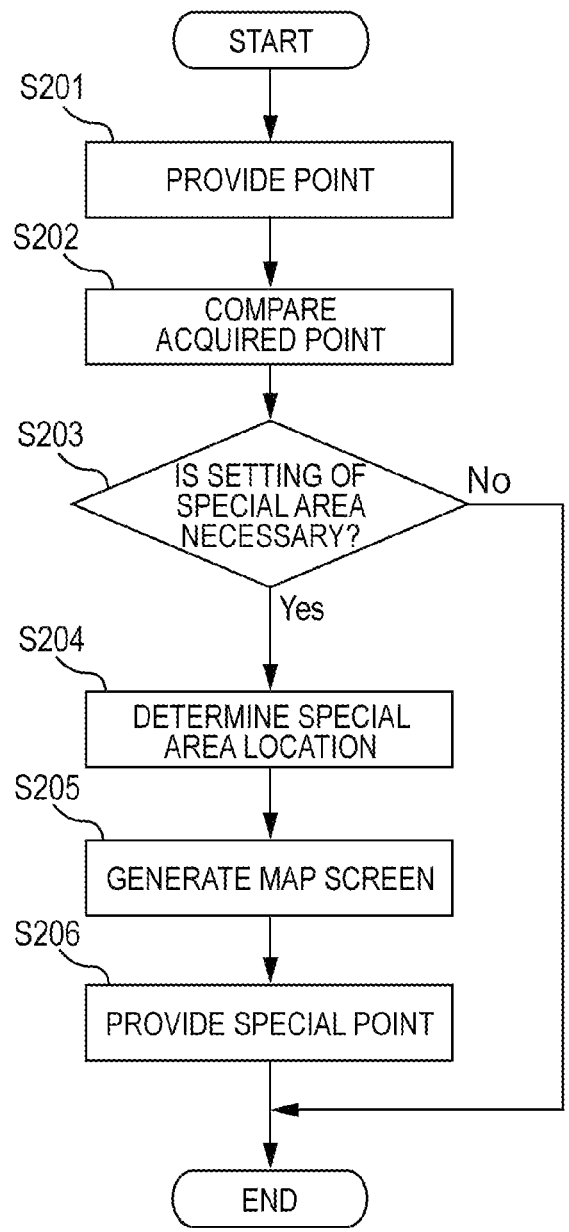
FIG. 12 is a flowchart describing a special area setting operation.

FIG. 12 is a flowchart describing a special area setting operation. Prior to the setting of the special area, first, the point providing unit 112 of the control unit 11 provides the team that occupies a unit area with points set to the unit area at a predetermined timing of the game (S201). Here, the predetermined timing is determined based on an elapsed time from start of a game, and points set to the unit area may be provided to the team that has actually occupied the unit area at a given time, or the points may be provided to all of the teams who has once occupied the unit area up to the given time (that is, there may be a case where a team that does not occupy the unit area at the given time may be provided with the points). Further, other method may be employed. In any case, a team that has occupied many unit areas is provided with many points.

Points provided to each team are added up for each team, and is temporarily stored in the data storage unit 12 as acquired point information of each team at a given time. Note that a team that has the most acquired points at the end of the game becomes a winning team.

Next, the comparison unit 113 of the control unit 11 compares the acquired points of the teams (S202). For example, when a game is performed among three teams of X, Y, and Z, for example, the gaps among the teams are calculated, and a ranking of the teams is determined according to the magnitude of the acquired points at a given time.

Following that, the special area setting unit 114 of the control unit 11 determines necessity of the setting of a special area according to the acquired points of the teams compared in the processing of S202 (S203). As a specific method of determining the necessity of the setting of a special area, for example, there is a method of comparing a gap between the most acquired points and the fewest acquired points, and a predetermined threshold. In this method, when the gap of the acquired points is the predetermined threshold or more, it is determined that the setting of a special area is necessary. Alternatively, the necessity of the setting of a special area may be determined by a total value of the acquired points of all teams or by a point acquirement status of each team in unit time.

When it is determined that the setting of a special area is not necessary (No in S203), the control unit 11 terminates the special area setting operation.

Meanwhile, when it is determined that the setting of a special area is necessary (Yes in S203), the special area setting unit 114 selects one area from a plurality of unit areas displayed on the map screen (note that, it is not necessarily one area) and determines a position where the special area is set (S204). In the present embodiment, a unit area located at a position that can be easily occupied by the team having a few acquired points is more likely to be set as the special area. That is, a unit area positioned closer to a unit area occupied by the team having a few acquired points is more likely to be set as the special area. For example, in FIG. 9, while the team X occupies many unit areas on the map screen, the team Y occupies less unit areas. In this case, unit areas positioned closer to the unit areas E, F, and G occupied by the team Y having a few acquired points (the areas in which the paths are indicated by slant lines in FIG. 9) is more likely to be set as the special area. To be specific, the unit areas F, G and H are more likely to be set as the special area. In setting the special area, when there is a unit area that has not been occupied by any team in the vicinity, the unit area is preferentially set as the special area. If not, a unit area occupied by any team is set as the special area. In a case of FIG. 9, the unit area F occupied by the team Y is set as the special area.

Note that, when the unit area H occupied by the team X having many acquired points is set as the special area, the setting seems to operate in favor of the team X. However, as described above, many paths are provided in the unit area H. Therefore, other teams (the team Y and the team Z) can easily pus into the unit area H (special area). Therefore, when the unit area H is set as the special area, there is a higher possibility that the setting works against the team X.

Further, when the gap of the acquired points between the team having many acquired points and the team having a few acquired points is larger, the special area may be more likely to be set to a position close to the home area of the team having a few acquired points. In other words, the special area is set such that the number of the paths that form the shortest route between the home area of the team having a few acquired points and the special area is decreased. For example, in FIG. 9, the unit area F close to the home area (unit area E) of the team Y having a few acquired points is set as the special area. Therefore, the team Y can easily occupy the unit area F and has a few acquired points because the team Y can easily defend the area from other teams.

The probability of providing special points to the team Y is increased.

When the setting position of the special area is determined, the setting position is stored in the data storage unit 12 as special area setting information.

When any of a plurality of unit areas is set as the special area, the screen generation unit 115 of the control unit 11 generates data of a map screen where an object (the egg-like object in the example of FIG. 9) is displayed on the unit area set as the special area (S205). The generated screen data is transmitted to the player terminal 20, and is displayed in the terminal display unit 24.

Then, special points are provided to the team that occupies the unit area set as the special area at a predetermined timing (S206). The special points are provided to the team that has occupied the special area (unit area) at a timing when a predetermined time has elapsed from the special area is set by the special area setting unit 114.

Alternatively, the special points may be provided to a team that has occupied the special area for the longest time during a period from the special area was set to a predetermined time has passed, or may be provided to a team that first occupied the special area.

As the special points, more points than points set to a normal unit area may be provided, or points taken from a team having many acquired points may be provided.

A lower ranked team having a few acquired points occupies the special area where the special points are provided, so that the lower ranked team is more likely to obtain a chance to reduce the gap with an upper rank team having many acquired points. Accordingly, the game is more likely to be a close battle, and the player can expect enjoyable and exciting development.

In the game of the present embodiment, direct intervention to the game progress by the server device 10 is not performed. For example, to reduce the gap between the acquired points of teams, providing the special points to the lower ranked team with no condition is not performed. Meanwhile, the special area is set in favor of the lower ranked team, and if the lower ranked team takes advantage of the chance and occupy the special area, the lower ranked team can reduce the point gap with the upper ranked team. That is, in the game of the present embodiment, indirect intervention is performed by the server device 10, and the game element is adjusted. Therefore, a fair game without causing the player to feel strangeness can be provided.

<Modification of Map Screen>

Figure 13:
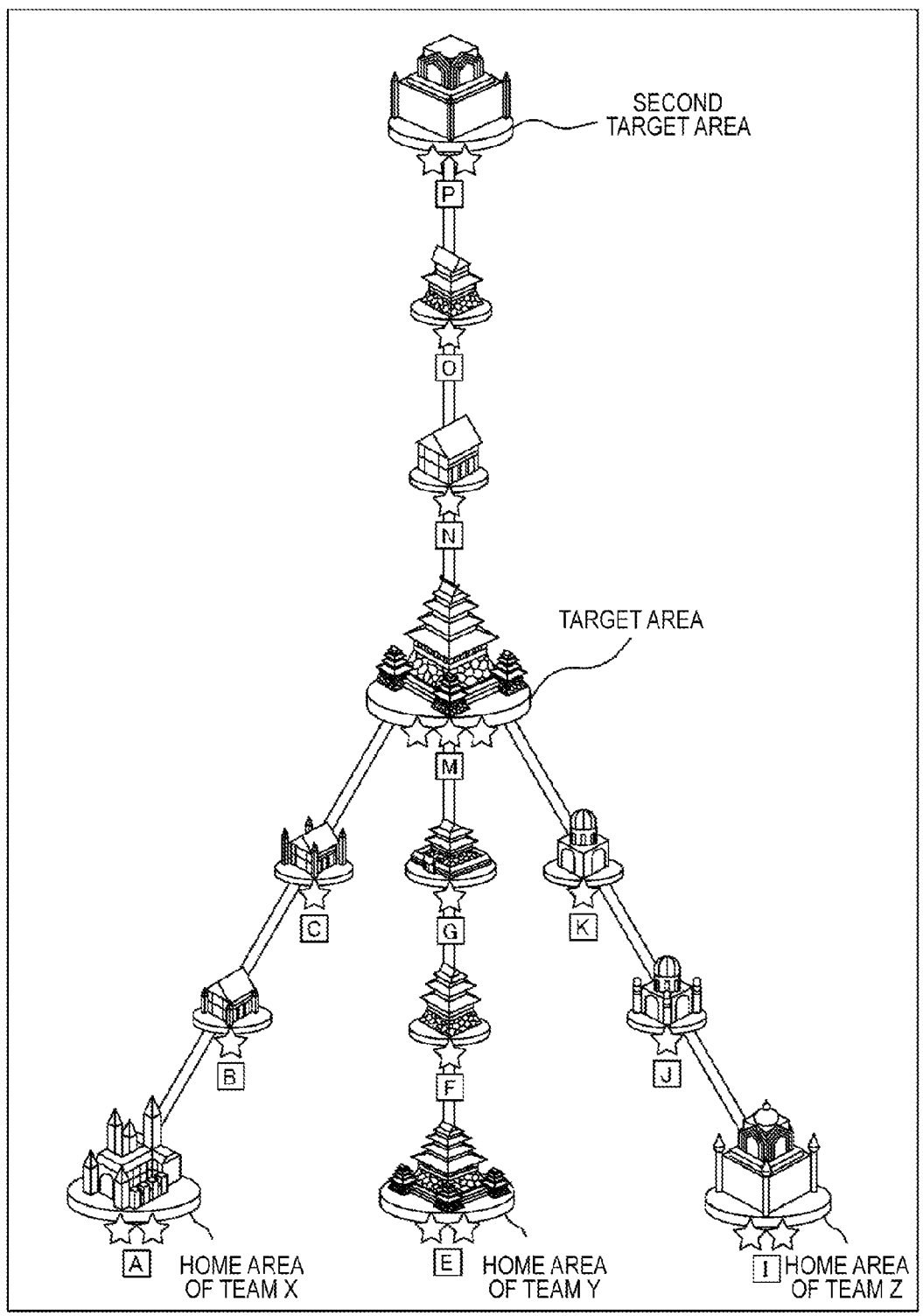
FIG. 13 is a diagram illustrating a modification of the map screen.

FIG. 13 is a diagram illustrating a modification of a map screen. As described above, a target area where larger points than other unit areas are provided is set on the game field (map screen) of the game of the present embodiment. Then, the target area is set so that the distance between the target area and a home area of each team becomes equal, that is, the number of paths between a home area and the target area becomes equal. In the case of FIG. 7, the home areas of the teams are provided to surround the target area (unit area M), and the target area is positioned in the center part of the map screen. Therefore, the target area is positioned as if it is the final destination. However, the position of the target area may just be equally away from each of the home areas of the teams, and it is not necessary the final destination.

On the map screen of FIG. 13, each team reaches the target area from each home area, and can further proceeds to the unit areas N, O, and P. That is, the unit area P functions as a second target area. In this case, the strategic element of the game can be further enhanced. For example, when the team X occupies the target area (unit area M) first, the team X is forced to determine whether focusing on the defense of the unit area M from the attack by the team Y and the team Z, or continuing to head off for the second target area (unit area P). Even the team Y and the team Z can expand the range of the game development, such as pushing in to the unit area M in cooperation with each other, and pushing in to the poorly defended enemy home area.

In this way, by appropriately setting the position of the target area in accordance with the shape of the game field (arrangement of the unit areas and paths to be set), and the like, the enjoyment and excitement can be enhanced. Note that the setting of the target area may be determined by the system administrator in advance, or may be randomly determined from the unit areas equally distant from the home areas of the teams.

Other Embodiments

The above-described embodiment is used to facilitate understanding of the present invention, and is not used to construe the present invention in a limited manner. The present invention can be modified and improved without departing from the gist of and scope of the present invention, and the present invention includes its equivalents. Further, the embodiments described below are also included in the present invention.

<A Case where Two or More Special Areas are Set at the Same Time>

In the above-described embodiment, an example has been described, in which one special area where special points are provided is provided on a game field (map screen), setting of the special area is not limited to the example, and two or more special areas may be set on the game field. Even in this case, a special area is set by the special area setting unit 114 to a position that can be easily occupied by the team having a few acquired points in accordance with a gap between acquired points of a team having a few acquired points and a team having many acquired points.

<Function of Object>

In the above-described embodiment, an example has been described, in which an object is displayed about the unit area where the special area is set. However, the displayed object may have various functions. For example, different rarities are set depending on the types of object, and the special points to be provided by occupation of a unit area where the object is set may differ. In this case, the special area setting unit 114 determines the type of object to be displayed according to the gap between the acquired points of the teams, and causes an object having higher rarity to be displayed when the gap between the acquired points of the teams is larger so that the team having a few acquired points is more likely to be provided with more special points.

Further, in addition to the unit area to which the object is set, another occupation of a predetermined unit area different therefrom may be a condition of providing special points. Furthermore, another occupation of the predetermined unit area may increase the special points to be provided.

Further, when the displayed object is an egg-like object, the special points to be provided may be changed by the egg hatching after the elapse of a certain period of time.

For example, by the hatch of the egg, a monster such as a dragon is introduced, and bonus points may be provided to a team that occupies the special area when egg has hatched, or the hatched dragon may participate in the subsequent battle as a friend for a predetermined period of time.

<Parameter Determining Setting Position of Special Area>

In the above-described embodiment, an example has been described, in which the location where the special area is set (the position of the unit area) is determined by the special area setting unit 114 in accordance with the gap between the acquired points of the teams. However, the location where the special area is set may be set as a parameter in advance. For example, the game field is graded in each area, and a parameter is set, in which a unit area distant from home areas of the teams (a unit area having a large number of paths) can be more highly graded. Then, in setting the special area, the special area setting unit 114 may set the special area in a unit area existing within the range set to a predetermined grade in accordance with the gap between the acquired points of the teams.

<Increase/Decrease of Unit Areas and Paths>

In the above-described embodiment, the unit areas and the paths displayed on the game field (map screen) are determined based on the map information. However, the unit areas and the paths may be increased/decreased according to the development of the game. For example, when a certain period of time has elapsed from start of a game, a new path may be provided in a home area of a lower ranked team having a few acquired points, and a new unit area connecting to the path may be provided. The area newly provided in this way is more likely to be occupied by the lower ranked team. Therefore, points can be easily provided to the lower ranked team, and thus the game is more likely to be a close battle.

Further, a new path is provided from a unit area close to a home area of a team having many acquired points, and the team may be more easily attacked by other teams. For example, in FIG. 9, a path connecting the unit area L and the unit area C appears, and similarly, a path connecting the unit area H and the unit area C appears. The number of the paths of the unit area C, which is close to the home area of the team X that occupies many unit areas, is increased. Therefore, the unit area C is easily attacked by the team Y and the team Z, whereby the game is more likely to be a close battle. Conversely, the number of the paths of a unit area close to the home area of a team having a few acquired points may be decreased.

Further, the game field information (map screen) is changed by an increase/decrease of the unit areas and the paths, and the special area is appropriately set on the changed game field, so that the strategic element of the game can be further enhanced, and a game element can be enhanced.

<Information Processing Device>

In the above-described embodiment, the game system 1 provided with one server device 10 as an example of the information processing device has been exemplarily illustrated. However, the game system is not limited to the example and a game system 1 provided with a plurality of server devices 10 may be employed. That is, a plurality of server devices 10 is connected through the network 2, and the server devices 10 may perform various types of processing in a disperse manner.

Further, it may be configured such that the player terminal 20 bares a part of the functions as the information processing device. In this case, the server device 10 and the player terminal 20 configure the information processing device.

<Game Program>

In the game system 1 of the above-described embodiments, a case has been exemplarily described, in which the server device 10 and the player terminal 20 are in cooperation with each other, so that the special area is set in a predetermined position on the game field and an indirect intervention to the game progress is performed. However, the present invention includes a game program for executing such processing. That is, the server device 10 and the player terminal 20 as the information processing device may execute the above-described various types of processing based on the game program.

[FIG. 1]
10 SERVER DEVICE
20 PLAYER TERMINAL
20 PLAYER TERMINAL
20 PLAYER TERMINAL
20 PLAYER TERMINAL

[FIG. 2]
COMMUNICATION UNIT
11 CONTROL UNIT
111 OCCUPANT TEAM DETERMINATION UNIT
112 POINT PROVIDING UNIT
113 COMPARISON UNIT
114 SPECIAL AREA SETTING UNIT
115 SCREEN GENERATION UNIT
12 DATA STORAGE UNIT
PLAYER INFORMATION
TEAM INFORMATION
MAP INFORMATION
13 INPUT UNIT
14 DISPLAY UNIT
15 COMMUNICATION UNIT

[FIG. 3]
21 TERMINAL CONTROL UNIT
22 TERMINAL STORAGE UNIT
23 TERMINAL INPUT UNIT
24 TERMINAL DISPLAY UNIT
25 TERMINAL COMMUNICATION UNIT

[FIG. 4]
PLAYER ID
TEAM PLAYER BELONGS TO
X
X
Z
Y
Z
X
POSSESSED CARD INFORMATION
POSSESSED CARD INFORMATION (1)
POSSESSED CARD INFORMATION (2)
POSSESSED CARD INFORMATION (3)
POSSESSED CARD INFORMATION (4)
POSSESSED CARD INFORMATION (5)
POSSESSED CARD INFORMATION (6)
DECK INFORMATION
DECK INFORMATION (1)
DECK INFORMATION (2)
DECK INFORMATION (3)
DECK INFORMATION (4)
DECK INFORMATION (5)
DECK INFORMATION (6)
AREA LOCATION INFORMATION
AREA A
AREA C
AREA I
AREA E
AREA J
AREA C

[FIG. 5]
TEAM X
MEMBER PLAYER (ID)
OCCUPIED AREA
ACQUIRED POINT
TEAM Y
... POINT

TEAM Z
... POINT
[FIG. 6]
UNIT AREA ID
POINT
PATH CONNECTION INFORMATION
SPECIAL AREA SETTING INFORMATION
[FIG. 7]
UNIT AREA (HOME AREA OF TEAM X)
UNIT AREA (HOME AREA OF TEAM Y)
UNIT AREA (HOME AREA OF TEAM Z)
PATH
UNIT AREA
TARGET AREA
BATTLE RESULT
COMMENT
UPDATE
[FIG. 8A]
PLAYER X1 (BELONGS TO TEAM X)
PLAYER Y1 (BELONGS TO TEAM Y)
UNIT AREA H
PATH
UNIT AREA G
[FIG. 8B]
PLAYER X1 (BELONGS TO TEAM X)
PLAYER Y1 (BELONGS TO TEAM Y)
UNIT AREA H
UNIT AREA G
[FIG. 8C]
PLAYER X1 (BELONGS TO TEAM X)
UNIT AREA H
UNIT AREA G
[FIG. 9]
OBJECT (SPECIAL AREA)
AREA OCCUPIED BY TEAM X
AREA OCCUPIED BY TEAM Y
AREA OCCUPIED BY TEAM Z
BATTLE RESULT
COMMENT
UPDATE
[FIG. 10]
PLAYER TERMINAL
SERVER DEVICE
S101 REQUEST UNIT AREA OCCUPATION
S102 DETERMINE OCCUPANT TEAM
S103 GENERATE SCREEN DATA
S104 DISPLAY SCREEN
[FIG. 11]
S121 IS THERE OCCUPANT TEAM?
S122 BATTLE WITH ENEMY PLAYER BELONGING TO OCCUPANT TEAM
S123 DAMAGE GIVEN TO ENEMY≥THRESHOLD
S124 CHANGE OCCUPANT TEAM OF UNIT AREA
S125 DO NOT CHANGE OCCUPANT TEAM OF UNIT AREA
S126 BATTLE WITH VIRTUAL ENEMY PLAYER
S127 DAMAGE GIVEN TO ENEMY≥THRESHOLD
S128 CHANGE OCCUPANT TEAM OF UNIT AREA
S129 DO NOT CHANGE OCCUPANT TEAM OF UNIT AREA
[FIG. 12]
S201 PROVIDE POINT
S202 COMPARE ACQUIRED POINT
S203 IS SETTING OF SPECIAL AREA NECESSARY?
S204 DETERMINE SPECIAL AREA LOCATION
S205 GENERATE MAP SCREEN
S206 PROVIDE SPECIAL POINT
[FIG. 13]
SECOND TARGET AREA
TARGET AREA
HOME AREA OF TEAM X
HOME AREA OF TEAM Y
HOME AREA OF TEAM Z

What is claimed is:

1. An information processing device configured to control a game in which, when a plurality of teams competes for occupation of a unit area in a game field including a path between two unit areas from among a plurality of unit areas that is larger than the number of teams, the number of the paths forming a shortest route connecting the unit area occupied by one team when the game is started and the unit area occupied by another team when the game is started are all equal, the information processing device comprising:
an occupant team determination unit configured to determine a team to occupy the unit area;
a point providing unit configured to provide a point set to the unit area to a team to occupy the unit area;
a storage unit configured to store an acquired point of each of the teams;
a comparison unit configured to compare the acquired points of the teams; and
a special area setting unit configured to set a special area that provides a special point in the unit area at a position where a team having a few acquired points more easily occupies the special area than a team having many acquired points from among the plurality of unit areas in accordance with the compared acquired points of the teams,
wherein the number of the teams is three or more,
a target area is set in any of the plurality of unit areas,
the number of the paths forming a shortest route connecting the unit area occupied by each team when the game is started and the target area is equal, and
a point set to the target area is larger than a point set to other unit areas.

2. An information processing device configured to control a game in which, when a plurality of teams competes for occupation of a unit area in a game field including a path between two unit areas from among a plurality of unit areas that is larger than the number of teams, the number of the paths forming a shortest route connecting the unit area occupied by one team when the game is started and the unit area occupied by another team when the game is started are all equal, the information processing device comprising:
an occupant team determination unit configured to determine a team to occupy the unit area;
a point providing unit configured to provide a point set to the unit area to a team to occupy the unit area;
a storage unit configured to store an acquired point of each of the teams;
a comparison unit configured to compare the acquired points of the teams; and
a special area setting unit configured to set a special area that provides a special point in the unit area at a position where a team having a few acquired points more easily occupies the special area than a team having many acquired points from among the plurality of unit areas in accordance with the compared acquired points of the teams,
wherein the special area setting unit sets the special area such that the larger the gap of the acquired points between a team having many acquired points and a team having a few acquired points, the smaller the number of the paths forming a shortest route connecting the unit area occupied by the team having a few acquired points when the game is started and the special area.

3. The information processing device according to claim 1, wherein a path through which a plurality of routes commonly passes is set in the game field, the plurality of routes connecting the unit area occupied by one team when the game is started and the unit area occupied by another team when the game is started.

4. A non-transitory computer-readable storage medium storing game program for causing an information processing device to realize a game, in which, when a plurality of teams competes for occupation of a unit area, in a game field including a path between two unit areas from among a plurality of unit areas that is larger than the number of teams, the number of the paths forming a shortest route connecting the unit area occupied by one team when the game is started and the unit area occupied by another team when the game is started are all equal, and for causing an information processing device to realize:

a function to determine, by an occupant team determination unit of the information processing device, a team to occupy the unit area;

a function to provide, by a point providing unit of the information processing device, a point set to the unit area to a team to occupy the unit area;

a function to store, by a storage unit of the information processing device, an acquired point of each team;

a function to compare, by a comparison unit of the information processing device, the acquired points of the teams; and a function to set, by a special area setting unit of the information processing device, a special area that provides a special point, in the unit area at a position that is more easily occupied by a team having a few acquired points than a team having many acquired points, from among the plurality of unit areas, in accordance with the compared acquired points of the teams, wherein the number of the teams is three or more, a target area is set in any of the plurality of unit areas, the number of the paths forming a shortest route connecting the unit area occupied by each team when the game is started and the target area is equal, and a point set to the target area is larger than a point set to other unit areas.

5. A non-transitory computer-readable storage medium storing game program for causing an information processing device to realize a game, in which, when a plurality of teams competes for occupation of a unit area in a game field including a path between two unit areas from among a plurality of unit areas that is larger than the number of teams, the number of the paths forming a shortest route connecting the unit area occupied by one team when the game is started and the unit area occupied by another team when the game is started are all equal, and for causing an information processing device to realize:

a function to determine, by an occupant team determination unit of the information processing device, a team to occupy the unit area;

a function to provide, by a point providing unit of the information processing device, a point set to the unit area to a team to occupy the unit area;

a function to store, by a storage unit of the information processing device, an acquired point of each team;

a function to compare, by a comparison unit of the information processing device, the acquired points of the teams; and a function to set, by a special area setting unit of the information processing device, a special area that provides a special point, in the unit area at a position that is more easily occupied by a team having a few acquired points than a team having many acquired points, from among the plurality of unit areas, in accordance with the compared acquired points of the teams, wherein the special area setting unit sets the special area such that the larger the gap of the acquired points between a team having many acquired points and a team having a few acquired points, the smaller the number of the paths forming a shortest route connecting the unit area occupied by the team having a few acquired points when the game is started and the special area.

* * * * *